July 8, 1947.   G. G. ZAHM   2,423,747
METHOD FOR THE EVAPORATION AND CONCENTRATION OF LIQUIDS
Filed May 31, 1943
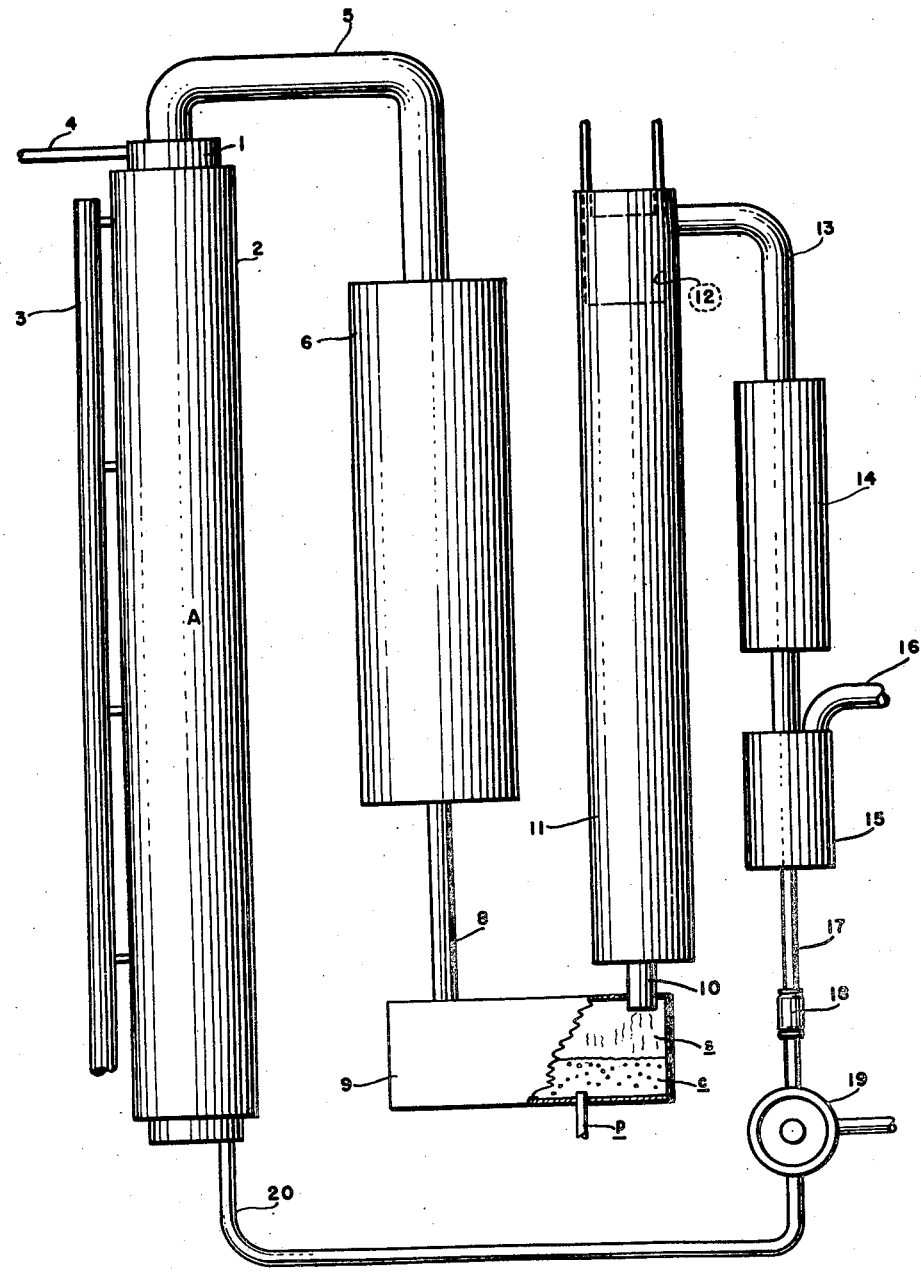
GEORGE G. ZAHM
INVENTOR
BY *Alfred W. Petcheft*
ATTORNEY

Patented July 8, 1947

2,423,747

UNITED STATES PATENT OFFICE 2,423,747

METHOD FOR THE EVAPORATION AND CONCENTRATION OF LIQUIDS

George G. Zahm, Buffalo, N. Y., assignor to Hurd Corporation, New York, N. Y., a corporation of Delaware Application May 31, 1943, Serial No. 489,225

3 Claims. (Cl. 99—205)

This invention relates in general to methods for the evaporation and concentration of liquids and more particularly food products such as fruit juices and the like. This application is related to my co-pending applications Serial Nos. 489,224 and 498,360.

Liquid food products such as juices and beverages contain vitamins and other nutritive elements which are highly sensitive to destruction by heat, oxidation, and hydrolysis. The common practice of evaporating this type of liquid in vacuum pans or similar types of vacuum dryers so as to avoid the use of high temperatures and thus preserve vitamin content, however, results in a flat tasteless product.

It has been found in connection with the present invention, that the highly volatile esters and essential oils which contribute materially to the flavor, taste and aroma of the natural juice are lost during evaporation. It has also been found that such esters and oils are particularly susceptible to "steam distillation" and will, therefore, be carried away from the liquid by the evaporating water no matter what conditions of temperature and pressure are employed in the concentrating or dehydrating procedure. It is, therefore, essential to recover the highly volatile, delicate flavor-producing ingredients and restore such ingredients to the concentrate so as to preserve substantially all of the flavor characteristics of the natural product.

It is therefore one of the principal objects of the present invention to provide apparatus and methods for concentrating or evaporating liquid food products without impairing, destroying or losing the vitamins, flavor-producing ingredients and other component substances within the liquid.

It is another and very important object of the present invention to provide apparatus and methods for the evaporation and concentration of liquid food products whereby the esters and other flavoring constituents normally lost during evaporation may be efficiently recovered and restored to the concentrate, thereby preserving, unharmed and unchanged, the original and natural qualities of aroma and taste normally present in fresh unprocessed liquids.

The above and other objects will become more fully apparent from the following specification, which by way of illustration rather than limitation, sets forth preferred processes and preferred forms of apparatus constituting embodiments of the present invention, the scope of which is defined in the appended claims.

In the drawings the single figure is a schematic view of a preferred form of apparatus embodying the present invention.

Referring now in more detail and by reference characters to the drawings, A designates an evaporating column comprising a central vertical tube 1, constructed of stainless steel, copper-bronze or other suitable material, due consideration being given to the corrosive tendencies or other chemical properties of the particular liquid food product being processed. The tube 1 is externally surrounded by a cylindrical steel steam jacket 2 provided with a steam manifold 3 connected to any conventional source or supply of live steam (the latter not being shown).

Entering into the upper end of the tube 1 is a supply line 4 connected to a conventional holding tank (not shown) for introducing into column A the unprocessed liquid such as fresh natural fruit juice for example. The tube 1 is interiorly provided with any suitable type of distributing means for causing the incoming liquid to flow downwardly over the inner face of the tube 1 in a thin, uninterrupted, rapidly moving film. Connected to and leading out of the upper end of the tube 1 is a large cross header 5 which is in turn connected at its other end to the upper end of a water-jacketed fractionating condenser 6, which discharges at its lower end through an outlet pipe 8 into a receiver 9 having a substantial vapor space s above the level of condensate c, the latter being withdrawn through the pipe p by any suitable eduction means (not shown) and discarded.

Opening at its lower end into the vapor space s of the receiver 9 is a short vertical vapor-line 10 opening into the lower end of a reflux condenser 11. At its upper end the reflux condenser 11 is provided with a suitable cooling coil 12 for maintaining the desired reflux ratio, and leading out of the upper end of the reflux condenser 11 is a vapor line 13 extending into the upper end of a final condenser 14 discharging at its lower end to a receiver 15 which is in turn connected through a vacuum line 16 to a suitable vacuum pump (not shown). At its lower end the receiver 15 discharges through a line 17 and conventional check valve 18 to one inlet of a mixing valve 19 which is connected to the other inlet of the mixing valve 19, the latter being connected at its outlet to conventional pasteurizing, can-filling and cooling apparatus (not shown). It will of course be understood that the can filling apparatus will include suitable apparatus for withdrawing the concentrate from the subatmospheric pressure of the evaporating apparatus and delivering it to suitable filling mechanism at atmospheric pressure.

In operation the liquid is rapidly drawn through the line 4 into the tube 1 of evaporating column A at relatively high velocity and is caused to flow over the inner face of the tube 1 in a thin substantially continuous sheet or film. In effect the inner face of the tube 1 is covered with a very thin tubular sheath of liquid moving at high velocity and shearing off any bubbles of vapor or solid particles which tend to form on the tube face. It is thought that this "shearing-off" action preserves a uniform and unbroken metal-to-liquid heat transfer relationship over practically the entire area of the tube face and effectively obviates the insulating effect which otherwise results from bubble formation and the deposition of solid matter or "crusting" as it may be called.

The high velocity film further operates to promote surface evaporation with a minimum of bubbling or foaming and, as a result, eliminates entrainment, that is to say, the carrying over of partially concentrated liquid with the vapor being drawn into the condenser.

Steam at suitable temperature and pressure is admitted to the steam jacket 2 through manifold 3, so as to heat the tube 1 uniformly throughout its length and heat the liquid passing through the tube to approximately 120° F.

By means of a suitable vacuum pump (not shown) a relatively high vacuum (approximately 29" of mercury) is imposed on the liquid and the concentrate discharged through the line 8 to the mixing valve 19.

Meanwhile, the vapor produced in the column A containing a very large proportion of the esters and flavor-producing ingredients of the liquid, is drawn through the cross header 5 and fractionally condensed in the primary or fractionating condenser 6, under temperature conditions which will result in the condensation of approximately 95% by volume of the vapor,. It has been found that this ratio of condensate will contain very little, if any, of the esters and other flavor-producing ingredients. The watery condensate is discharged from the receiver 9 through the waste line $p$ while the uncondensed vapor, now very rich in ester content passes through the line 10 into the reflux condenser 11 wherein it is finally rectified to abstract the residual waste vapor which trickles back into the receiver 9 while a highly concentrated ester-containing vapor passes over through the line 13 and is condensed in the condenser 14 to produce a very highly concentrated ester fraction which is collected in the receiver 15 and ultimately reincorporated with the concentrate in the mixing valve 19.

It will, of course, be evident that when the apparatus is first put into operation the initial concentrate may have to be discarded or allowed to accumulate for a few minutes until the ester fraction begins to come over and accumulate in the receiver 15. Thereafter, however, the operation may be continuous for as long a period as fresh liquid is available, barring accidents, breakdowns and similar fortuitous circumstances.

By reason of the very high vacuum and low temperature employed, the liquid can be concentrated without impairment or destruction of vitamins and other nutrient substances is largely prevented. At the same time the highly volatile, delicate esters and other flavor-producing substances are almost immediately pulled out of the liquid as it enters the column A and the ensuing process of rapid, fractional condensation and reflux concentration recovers such esters and related substances in unchanged form for restoration to the concentrate, thereby preventing any material loss of natural flavor or aroma.

It should be understood that changes and modifications both in the methods as well as in the form, construction, arrangement and combination of the several parts of the apparatus for evaporating or concentrating liquids may be made and substituted for those herein shown and discussed without departing from the nature and principle of the present invention.

Having thus described the present invention, what is desired to be secured by these Letters Patent is included in the following claims:

1. The method of concentrating liquid food products such as fruit juices, beverages, extracts and infusions, which method comprises rapidly flowing the liquid food product in a thin film over a heat exchange surface under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor-producing constituents, passing the residual vapors directly into a reflux condenser without breaking the vacuum and thereby finally condensing substantially all of the residual vapors to form a concentrated liquid fraction containing the flavor producing constituents, and re-introducing said liquid fraction into the concentrate portion thereby restoring to such concentrate portion the flavor producing ingredients originally therein present.

2. The method of concentrating liquid food products such as fruit juices, beverages, extracts and infusions, which method comprises rapidly flowing the liquid food product in a thin film over a heat exchange surface at a temperature of less than 130° F. under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor producing constituents, passing the residual vapors directly into a reflux condenser without breaking the vacuum and thereby finally condensing substantially all of the residual vapors to form a concentrated liquid fraction containing the flavor producing constituents, and re-introducing said liquid fraction into the concentrate portion thereby restoring to such concentrate portion the flavor producing ingredients originally therein present.

3. The method of concentrating liquid food products such as fruit juices, beverages, extracts and infusions, which method comprises rapidly flowing the liquid food product in a thin film over a heat exchange surface under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor producing constituents, passing the residual vapors directly into a reflux condenser without breaking the vacuum and thereby finally condensing substantially all of the residual vapors to form a concentrated liquid fraction containing the flavor producing constituents, re-introducing said liquid fraction into the concentrate portion thereby restoring to such concentrate portion the flavor producing ingredients originally therein present, and pumping the re-combined concentrate portion and liquid fraction out to atmospheric pressure.

GEORGE G. ZAHM.

REFERENCES CITED

The following references are of record in the file of this patent:

UNITED STATES PATENTS

| Number | Name | Date |
|---|---|---|
| 2,155,971 | Houseman | Apr. 25, 1939 |
| 518,428 | Solway | Apr. 17, 1894 |
| 1,303,321 | Hudson et al. | May 13, 1919 |
| 1,418,885 | Schulze | June 6, 1922 |
| 2,379,518 | Hall | July 3, 1945 |
| 1,189,127 | Kellogg | June 27, 1916 |
| 2,217,261 | Stevens | Oct. 8, 1940 |
| 2,104,415 | Davies | Jan. 4, 1938 |
| 2,156,212 | Wendt | Apr. 25, 1939 |
| 2,145,395 | Horvath | Jan. 31, 1939 |
| 2,098,961 | Fronmuller | Nov. 16, 1937 |
| 48,268 | Gale | June 20, 1865 |